UNITED STATES PATENT OFFICE.

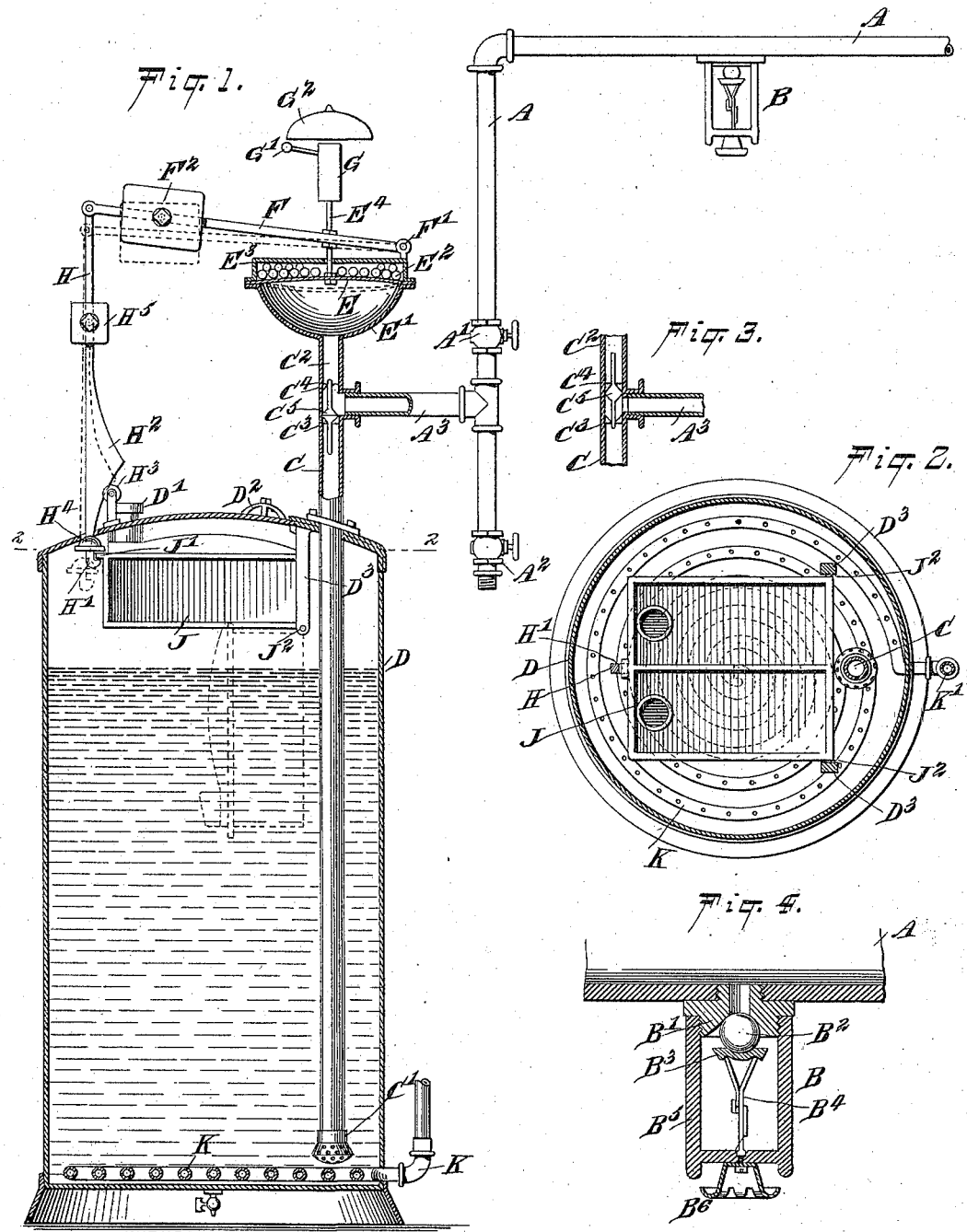

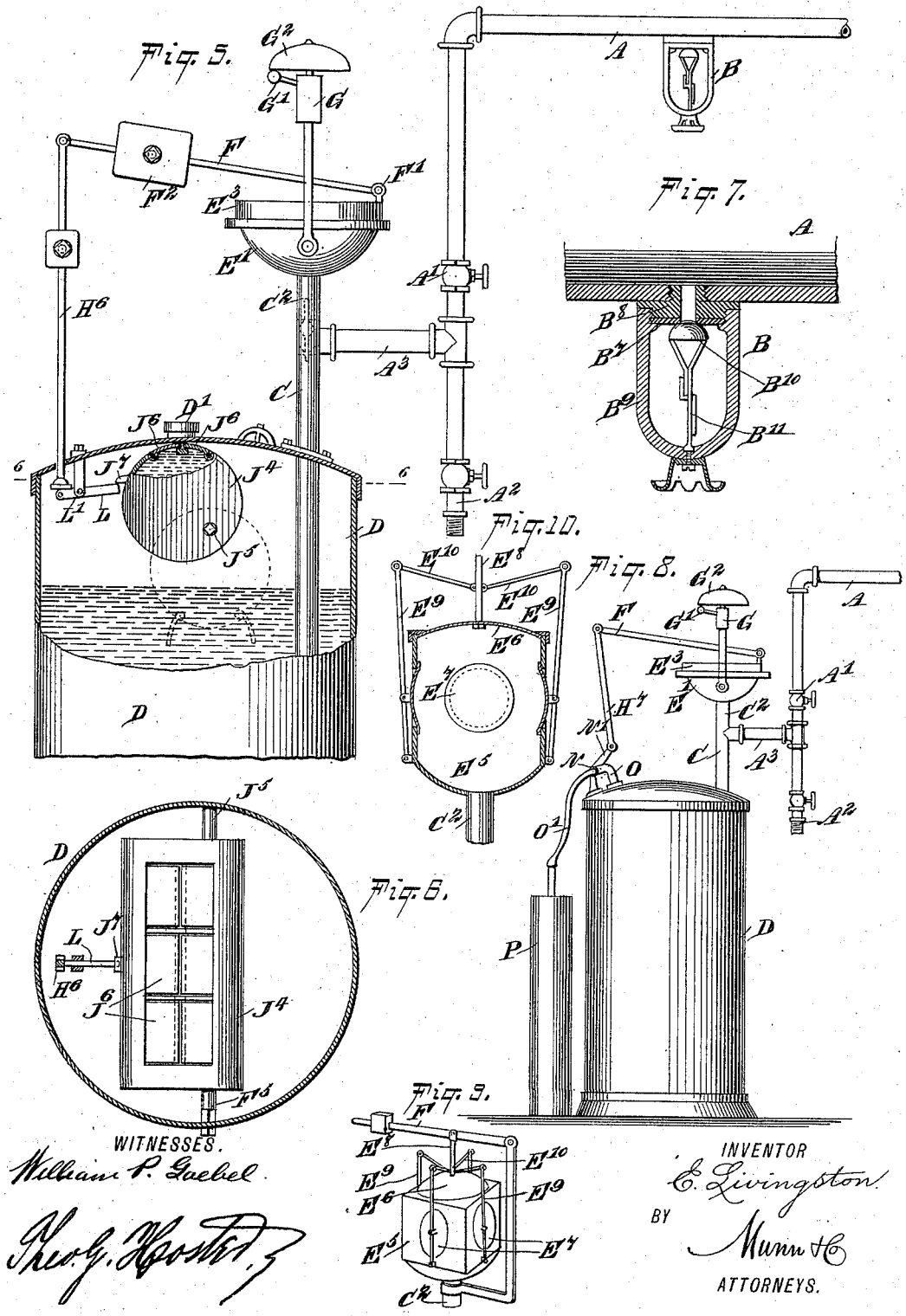

EDWARD LIVINGSTON, OF NEW ORLEANS, LOUISIANA.

AUTOMATIC FIRE-EXTINGUISHER.

SPECIFICATION forming part of Letters Patent No. 575,253, dated January 12, 1897.

Application filed October 22, 1895. Serial No. 566,484. (No model.)

*To all whom it may concern:*

Be it known that I, EDWARD LIVINGSTON, of New Orleans, in the parish of Orleans and State of Louisiana, have invented a new and Improved Automatic Fire-Extinguisher, of which the following is a full, clear, and exact description.

The invention relates to automatic fire-extinguishers, such as shown and described in the Letters Patent of the United States No. 504,926, granted to me on September 12, 1893, and the application for Letters Patent, Serial No. 545,934, filed by me April 16, 1895, and allowed August 12, 1895.

The object of the present invention is to provide certain new and useful improvements in fire-extinguishers whereby a fluid can be used as the expellant of a fire-extinguishing fluid.

The invention consists principally of a distributing-pipe containing a fluid under pressure, a vessel connected with the said pipe and adapted to contain the fire-extinguishing fluid normally dormant, a diaphragm connected with the said pipe, and a valve which closes the passage to the said vessel while opening that to the said diaphragm, and vice versa.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a sectional side elevation of the improvement. Fig. 2 is a sectional plan view of the same on the line 2 2 of Fig. 1. Fig. 3 is a sectional side elevation of the double valve in a different position. Fig. 4 is an enlarged sectional side elevation of the fusion-valve. Fig. 5 is a side elevation of a modified form of the apparatus. Fig. 6 is a sectional plan view of the same on the line 6 6 in Fig. 5. Fig. 7 is an enlarged side elevation of a modified form of fusion-valve shown in Fig. 5. Fig. 8 is a side elevation of the apparatus arranged for using a liquefied fluid as the expellant. Fig. 9 is a perspective view of a modified form of diaphragm, and Fig. 10 is an enlarged sectional side elevation of the same.

The improved apparatus is provided with a series of pipes A, preferably arranged near the ceiling in each of the rooms to be protected by the fire-extinguisher. Each of the pipes A is provided with one or more fusion-valves B, arranged to open automatically as soon as the temperature in the room exceeds, say, 160° Fahrenheit, so that the fire-extinguishing matter contained in and passing into the pipes A, as hereinafter more fully described, can pass through the valves B upon the fire and extinguish the same.

Each pipe A is provided with a globe-valve A' and with a valved hose connection $A^2$, between which and the valve A' is arranged a T $A^3$, connecting with a siphon-pipe C, extending into a closed vessel D, containing alkaline water or other liquid fluid and arranged in a suitable part of the building. The lower end of the siphon-pipe C extends close to the bottom of the vessel D, and the upper outer end of the said pipe is provided with a short extension $C^2$, supporting a diaphragm-casing E', containing a diaphragm E, weighted on top with shot or other matter $E^2$, contained in the cover $E^3$ of the diaphragm-casing E'. A stem $E^4$ is connected with the diaphragm E, at or near the middle thereof, and passes upward through the cover $E^3$ to connect with a lever F and with an alarm G, having a striker G', adapted to sound on a bell $G^2$ whenever the said stem $E^4$ moves downward. In the upper end of the pipe C and in the lower end of the extension $C^2$ are arranged the valve-seats $C^3$ and $C^4$, adapted to be alternately engaged by a double valve $C^5$, fitted to slide in the siphon-pipe, and normally held on the seat $C^3$ by the pressure of the fluid contained within the pipes A and $A^3$. The diaphragm E is held in an uppermost position by the said fluid passing from the pipe $A^3$ up the extension $C^2$ into the casing E' to press against the under side of the diaphragm.

Now in case the fusion-valve B opens a reduction of pressure takes place in the pipes A $A^3$ $C^2$ and casing E', so that the diaphragm E, owing to the weight $E^2$, is forced downward, whereby the alarm mechanism G is set in motion and an alarm is sounded. At the same time a downward-swinging motion is given to the previously-mentioned lever F, fulcrumed at F' on the cover E³ and pivotally connected at its free end with link H, extending at its lower end through an opening in the cover of the vessel D to engage with its catch end H' a projection J' on the tank J, containing a gas-generating substance, and pivoted at J² on brackets D³, depending from the cover of the vessel D.

On the link H is arranged an incline H² in engagement with a friction-roller H³, journaled on the top of the cover for the vessel D, so that when the lever F swings downward, as previously explained, then the link H is forced downward and to one side by the incline H² traveling over the friction-roller H³. The link H in thus swinging to one side disengages its catch H' from the lug J', so that the tank J swings downward into the position shown in Fig. 1, and its contents discharge into the vessel D and the alkaline water contained therein, so that gas is generated to force the water up through the siphon-pipe C, whereby the valve C⁵ is forced from its seat C³ and against the seat C⁴, (see Fig. 3,) to permit the water and gas to pass through the T A³ into the pipe A and through the open valves B onto the fire. As the double valve C⁵ seats itself on the seat C⁴ the liquid from the vessel D is prevented from passing into the extension C² and diaphragm-casing E'.

It is understood that the tank J contains sulfuric acid or other suitable chemical for generating gas within the vessel D to exert a sufficient pressure on the liquid contained in the vessel and force it through the pipes C and A and the open valves B onto the fire.

On the lower end of the link H is arranged a washer H⁴, adapted to close the opening in the cover of the vessel D for the said link to prevent the escape of gas when it is generated in the vessel D. In the cover of the vessel D is arranged one or more filling-caps D' for introducing the sulfuric acid or other gas-generating material into the tank J. A manhole D² and a pop safety-valve are provided in the said cover.

In the bottom of the vessel D is arranged a coil K, connected with a supply-pipe K' for filling the vessel D and for stirring up the contents therein whenever necessary. The lever F is preferably provided with a weight F² to assist in weighting the diaphragm E and to insure a rapid swinging of the lever when pressure is reduced on the under side of the diaphragm E. On the link H is also arranged a weight H⁵ to insure a return or inward-swinging movement of the said link whenever the lever F is raised and the tank J is in an uppermost position to cause the catch H' to engage the lug J', so as to hold the tank J normally in a central position. (Shown in Fig. 1.)

As illustrated in Figs. 5 and 6, the tank J⁴, containing the acid for generating the gas within the vessel D, is made in cylindrical form and is hung eccentrically on trunnions J⁵, journaled in the sides of the vessel D, one of the trunnions J⁵ extending through the side of the vessel to the outside thereof to permit of applying a wrench or other tool on the square end of the trunnion, so as to turn the tank J⁴ into an uppermost position when setting the apparatus ready for work. This tank J⁴ is provided in its top with hinged valves J⁶, adapted to swing open when the tank moves into a lowermost position, as illustrated in dotted lines in Fig. 5, to permit of discharging the contents of the tank into the alkaline water contained in the vessel D. The valves J⁶ are located opposite the filling-cap D'.

On one side of the tank J⁴ is arranged a lug J⁷, normally engaged by one end of a lever L, fulcrumed at L' on a bracket depending from the cover of the vessel D, the outer end of the said lever L being engaged by the lower end of the link H⁶, pivoted on the outer end of the lever F, and normally held in an uppermost position by the diaphragm E as long as the latter is acted on by the pressure in the pipes A. Now when the pressure is reduced by one of the valves opening, as above explained, then the lever F will swing downward and the link H⁶ will grip the lever L to disengage the latter from the lug J⁷, whereby the tank J⁴ is free to swing downward, and as it is eccentrically mounted it will do so and discharge its contents into the vessel D. The above-described operation is then repeated—that is, the water and gas in the vessel D is forced out through the pipes C and A and valves B onto the fire.

As shown in Fig. 8, the link H⁷, connected with the lever F, is pivotally connected with the arm N' of a valve N, arranged in a pipe O, discharging into the top of the vessel D. The valve N is also connected by a hose O' with a vessel P, containing a liquid gas, so that when the lever F swings downward upon a reduction of pressure in the pipes A, then the link H⁷ turns the arm N' to open the valve N and to connect the vessel P with the vessel D. The liquefied gas thus becomes liberated and passes into the vessel D to press on the water or other fire-extinguishing fluid therein and force the same out through the pipes C and A and valves B onto the fire, as previously explained.

Instead of having but a single diaphragm I may employ a series of diaphragms, as shown in Figs. 9 and 10, and in this case the diaphragm-casing E⁵ is provided in its top with a diaphragm E⁶, and in each of its four sides with a diaphragm E⁷. The top diaphragm E⁶ is connected with the stem E⁸, engaging the lever F, previously mentioned, and the other diaphragms E⁷ are pivotally connected with levers E⁹, connected by links E¹⁰ with the said stem $E^8$. Now on a reduction of pressure in the pipe A, and consequently in the casing $E^5$, the several diaphragms will move inwardly to actuate the lever F, as previously described.

The fusion-valves B may be of the construction shown and described in the Letters Patent or the application previously referred to, or may be modified as shown in Figs. 4 and 7.

When the valve A' in the pipe A is closed and the valve in the connection $A^2$ is opened and a hose is attached thereto, then the water or other liquid in the vessel D passes through the hose for sprinkling and other purposes.

The fusion-valve shown in Fig. 4 is provided with a valve-seat B', secured in the pipe A and formed with a bell-shaped mouth in which is seated the ball-valve $B^2$, made of celluloid, aluminium, porcelain, glass, or other suitable material, the said valve resting at its lower end on a cap $B^3$, held in place by a crutch $B^4$, supported at its lower end by a yoke $B^5$ screwing on the valve-seat B'. The crutch $B^4$ is composed of several members fastened together by an easily-fusible solder, so that when the temperature in the room rises above 160° then the fusion-solder disconnects the several members, and consequently the crutch $B^4$ falls apart and the valve $B^2$ is removed from its seat B'. When this takes place, the pressure of the fluid contained in the pipes A causes the fluid to pass through the open valve-seat B' into the yoke $B^5$ to be sprayed by a deflector or sprayer $B^6$, secured on the lower end of the yoke $B^5$.

The fusion-valve shown in Fig. 7 is provided with a valve-seat $B^7$, made of a flat piece of block-tin, lava, mica, or similar material, and is held against a nipple $B^8$ and secured in place by the yoke $B^9$ screwing on the said nipple. The valve $B^{10}$, seated on the said seat $B^7$, is made semispherical and preferably of Tobin bronze or German silver and supported on a crutch B'' similar to the crutch $B^4$ and the one shown and described in the application for Letters Patent above referred to.

By making the valve-seats with a bell-shaped mouth, as shown in Fig. 4, or of block-tin or like material, as shown in Fig. 7, I am enabled to make a perfect joint between the ball and seat to prevent leakage.

Having thus fully described my invention, I claim as new and desire to secure by Letters Patent—

1. An automatic fire-extinguisher, comprising a distributing-pipe containing a fluid under pressure, a vessel connected with the said pipe and adapted to contain a fire-extinguishing fluid, normally dormant, a diaphragm connected with the said pipe, and a valve for closing the said pipe to the said vessel and opening it to the said diaphragm, and vice versa, substantially as shown and described.

2. An automatic fire-extinguisher, comprising a distributing-pipe containing a fluid under pressure, a vessel connected with the said pipe and adapted to contain a fire-extinguishing fluid, normally dormant, a diaphragm connected with the said pipe, a valve for closing the said pipe to the said vessel and opening it to the said diaphragm, and vice versa, a tank for supplying the gas-generating substance, and an intermediate mechanism between the said diaphragm and the said tank, to allow the contents of the tank to pass into the said vessel upon a reduction of pressure in the said pipe, substantially as shown and described.

3. An automatic fire-extinguisher, comprising a distributing-pipe containing a fluid under pressure, a weighted diaphragm connected with the said pipe, a vessel connected with the said pipe and adapted to contain a fire-extinguishing fluid, a tank for supplying the gas-generating substance, and arranged in said vessel, an intermediate mechanism between the said diaphragm and the said tank, to lock the latter normally in place and to unlock the same when a reduction of pressure takes place in the said pipe, and a double valve for connecting the said vessel with the said pipe and the said diaphragm with the pipe, substantially as shown and described.

4. An automatic fire-extinguisher, provided with a fusion-valve comprising a valve-seat with a bell-shaped mouth, and held on the pipe containing the fire-extinguishing matter, a ball-valve adapted to be seated on the said seat, a cup supporting the said valve, and a crutch engaging with the said cup and made of several members diverging at their upper portions, and a fusion-solder for holding the said members together, substantially as shown and described.

5. In a fire-extinguishing apparatus, the combination of a distributing-pipe having self-opening valves, a vessel having an outlet connected to the pipe and arranged to contain a fire-extinguishing fluid, a tank in the vessel adapted when moved to discharge its contents into the vessel, a lever, a connection between the lever and the tank, means actuated by the fall of pressure in the pipe for moving the lever, said means comprising a casing, a series of diaphragms carried therein and adapted for independent operation, and connections between the lever and the several diaphragms to move the lever from said diaphragms, whereby the tank is moved in the vessel to discharge its contents into the vessel, substantially as set forth.

EDWARD LIVINGSTON.

Witnesses:
F. A. CONANT,
SIDNEY ROBINSON.